Figure 1:
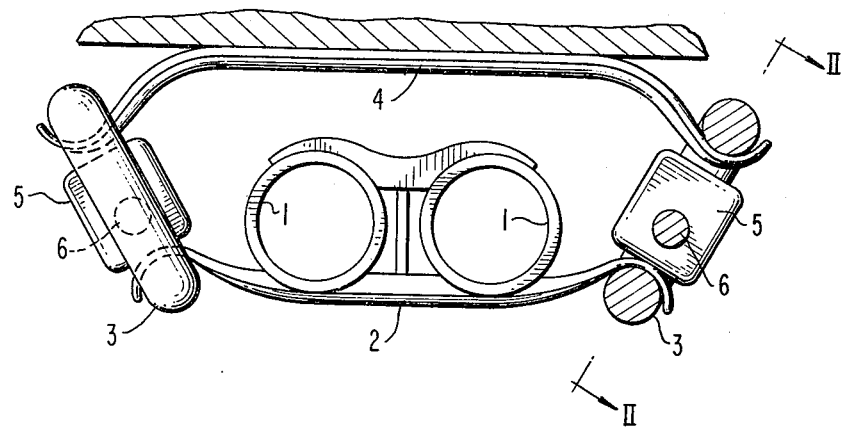

United States Patent [19]
Kleinschmit

[11] 3,977,486

[45] Aug. 31, 1976

[54] MOUNTING FOR EXHAUST INSTALLATIONS OF MOTOR VEHICLES

[75] Inventor: Einhard Kleinschmit, Esslingen-Hegensberg, Germany

[73] Assignee: Daimler-Benz Aktiengesellschaft, Germany

[22] Filed: Mar. 26, 1975

[21] Appl. No.: 562,097

[30] Foreign Application Priority Data
Mar. 30, 1974 Germany............................ 2415536

[52] U.S. Cl............................. 180/64 A; 248/54 R; 248/60; 248/62
[51] Int. Cl.²....................................... B60K 13/04
[58] Field of Search ............. 180/64 A; 248/60, 62, 248/54 R, 58, 74 R, 65, 72

[56] References Cited
UNITED STATES PATENTS

| | | | |
|---|---|---|---|
| 2,981,351 | 4/1961 | Knickerbocker et al. | 180/64 A |
| 3,204,901 | 9/1965 | Dunn | 248/60 |
| 3,313,503 | 4/1967 | Mayr | 248/60 |

FOREIGN PATENTS OR APPLICATIONS

| | | | |
|---|---|---|---|
| 870,366 | 3/1953 | Germany | 180/64 A |
| 678,688 | 9/1952 | United Kingdom | 248/60 |

*Primary Examiner*—M. H. Wood, Jr.
*Assistant Examiner*—Milton L. Smith
*Attorney, Agent, or Firm*—Craig & Antonelli

[57] ABSTRACT

A mounting support for exhaust gas systems of motor vehicles, in which one or more exhaust pipes are secured to a holding member, and this holding member is suspendingly retained in rings consisting of elastic materials, which in their turn, are suspended from mounting means fixed on the vehicle; the rings are provided with bumpers arranged on the inside of the ring-form, retained by webs and made in one piece with the rings; the bumpers limit the inward or upward spring deflection of the rings.

8 Claims, 2 Drawing Figures

MOUNTING FOR EXHAUST INSTALLATIONS OF MOTOR VEHICLES

The present invention relates to a mounting support for exhaust gas installations of motor vehicles, in which one or two exhaust pipes are secured to a holding member and this holding member is retained by suspension in rings consisting of elastic material which, in their turn, are suspended from mounting means fixed to the vehicle.

Opposed to the advantages, which such types of mounting support entail, are the disadvantages that, as a rule, a separate inward spring deflection abutment has to be provided in the prior art constructions and that the safety against unintentional disengagement of the suspension is only slight. The present invention is therefore concerned with the task to so construct the mounting support that these disadvantages are avoided.

The underlying problems are solved according to the present invention in that the rings are provided with abutment pads or bumpers arranged on the inside of the ring shape, retained by webs and made in one piece with the rings, which limit the inward spring deflection path of the rings.

The arrangement of separate inward spring deflection abutments becomes superfluous by this construction of the rings. Vibrations and oscillations which may occur, are thereby limited. Additionally, a certain safety is achieved against the fact that the holding member can readily become disengaged in its suspension and the rings can be lost.

In one embodiment of the inventive subject matter, the abutment pads or bumpers may be so arranged that they clamp fast the suspended holding member. A disengagement of the holding member out of the rings during the occurrence of very strong vibrations or during a lifting of the exhaust pipes is made impossible thereby. The ring itself is not lost even with a unilateral disengagement from its suspension. In the axial direction of the rings, the bumpers may be constructed thicker than the rings themselves.

Accordingly, it is an object of the present invention to provide a mounting support for exhaust gas installations of motor vehicles which avoid by simple means the aforementioned shortcomings and drawbacks encountered in the prior art.

Another object of the present invention resides in a mounting support for exhaust pipe systems of motor vehicles which obviates the need for separate abutments limiting the inward spring deflection and at the same time increases the safety against an unintentional disengagement of the suspension.

A further object of the present invention resides in a mounting support for exhaust pipes of motor vehicles in which occurring vibrations are reliably limited, yet the provision of separate abutments limiting inward spring deflections become superfluous.

Figure 2:
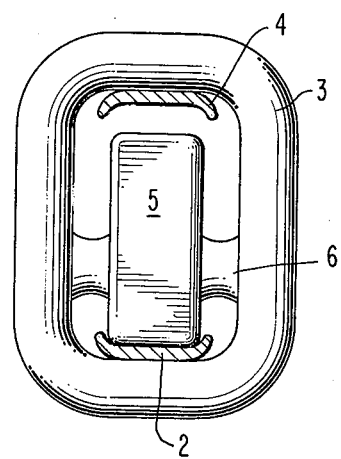

These and further objects, features and advantages of the present invention will become more apparent from the following description when taken in connection with the accompanying drawing which shows, for purposes of illustration only, one embodiment in accordance with the present invention, and wherein:

FIG. 1 is a rear elevational view, partly in cross section, of a mounting support for exhaust systems in accordance with the present invention; amd FIG. 2 is a cross-sectional view, on an enlarged scale, through the mounting support taken along line II—II of FIG. 1.

Referring now to the drawing wherein like reference numerals are used throughout the two views to designate like parts, according to FIG. 1, the mounting support for the two exhaust pipes 1 consist of a holding member 2 which is suspended on both sides of the exhaust pipes 1 by means of one ring 3 each of elastic material at a mounting means 4 fixed to the vehicle.

In order to limit vibrations and oscillations of the suspension and to obviate the need for separate abutments limiting the inward spring deflection and at the same time insure against the unintentional disengagement of the rings 3, abutment bumpers 5 are arranged inside of the ring shape of the rings 3, as can be seen from FIG. 2, which are retained by webs 6. In the axial direction of the rings 3, the abutment bumpers 5 are constructed thicker than the rings 3 themselves. Furthermore, they are so arranged inside of the rings 3 that they clamp fast the holding member 2. As to the rest, the external shape of the abutment bumpers 5 may be matched to the shape of the holding members 2 and their mutual coordination.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A mounting support for exhaust gas installations of motor vehicles in which at least one exhaust pipe is secured in a holding means, said holding means is suspendingly retained in ring means consisting of elastic material, and said ring means are suspended from mounting means fixed to the vehicle, wherein the ring means are provided with abutment bumper means and, web means formed in one piece with the ring means and the abutment bumper means for retaining said abutment bumper means inside the ring shape of said ring means with the surfaces of said abutment bumper means being spaced from a surface defining the ring shape whereby said abutment bumper means limits the spring deflection of the ring means.

2. A mounting support according to claim 1, wherein the abutment bumper means are so arranged that they clamp fast the suspended holding means.

3. A mounting support according to claim 2, wherein the abutment bumper means are constructed thicker in the axial direction of the ring means than the ring means themselves.

4. A mounting support according to claim 3, wherein the ring means are of elongated shape, said web means extending transversely to the elongated shape and the bumper means being longer in the direction of elongation of the ring means than in the direction of their retention by the web means.

5. A mounting support according to claim 4, wherein the bumper means are of smaller dimension than the ring means in the direction of elongation and are retained by the web means more closely to the holding means than to the mounting means.

6. A mounting support according to claim 1, the abutment bumper means are constructed thicker in the axial direction of the ring means than the ring means themselves.

7. A mounting support according to claim 6, wherein the ring means are of elongated shape, said web means extending transversely to the elongated shape and the bumper means being longer in the direction of elongation of the ring means than in the direction of their retention by the web means.

8. A mounting support according to claim 7, wherein the bumper means are of smaller dimension than the ring means in the direction of elongation and are retained by the web means more closely to the holding means than to the mounting means.

* * * * *